United States Patent [19]

Armond et al.

[11] Patent Number: 5,331,269

[45] Date of Patent: Jul. 19, 1994

[54] STANDBY CONTROL FOR ELECTROMAGNET

[76] Inventors: Joseph A. Armond; Juanito Rodenas, both of 2235 N. Knox Ave., Chicago, Ill. 60639

[21] Appl. No.: 883,941

[22] Filed: May 14, 1992

[51] Int. Cl.[5] .............................................. H01F 7/06
[52] U.S. Cl. ...................................... 320/39; 320/59; 307/66
[58] Field of Search ...................... 320/39, 40, 32, 22, 320/59; 307/66; 361/139, 145; 335/290

[56] References Cited

U.S. PATENT DOCUMENTS

| | | | |
|---|---|---|---|
| 3,758,839 | 9/1973 | Medlar | 320/32 |
| 3,812,415 | 5/1974 | Van Gilder et al. | 320/39 |
| 3,874,551 | 4/1975 | Harkness | 320/39 |
| 4,032,828 | 6/1977 | Strobl et al. | 320/39 |
| 4,354,149 | 10/1982 | Armond et al. | 320/40 |
| 4,672,293 | 6/1987 | Crampton | 320/14 |

Primary Examiner—Steven L. Stephan
Assistant Examiner—Thomas M. Dougherty
Attorney, Agent, or Firm—Paul H. Gallagher

[57] ABSTRACT

A power circuit has an AC portion connected with a main AC source and a DC source portion including a magnet and battery constantly connected in parallel. Back-to-back SCRs control a rectifier between the AC and DC portions. A DC control circuit includes a pulse transformer controlled by a capacitor charged by DC pulses at a rate controlled by a manual setting. Upon discharge, the capacitor energizes the pulse transformer and thus turns ON the magnet and battery. Upon disconnecting the load, the battery is automatically charged at about 4 amperes. Safe and unsafe indicators are connected across the battery, and upon drop of battery charge, digital control elements in the control circuit control those indicators to correspondingly indicate safe or unsafe conditions.

18 Claims, 5 Drawing Sheets

STANDBY CONTROL FOR ELECTROMAGNET

BRIEF SUMMARY OF THE INVENTION

The invention resides in the field of energizing and controlling a electromagnet. Such an electromagnet is utilized in two major phases in the industrial field, (a) as a lift magnet for lifting a load, and (b) for use in holding down a workpiece, for example as in a grinder. The electromagnet is normally energized by a main AC source, such as provided as a community source, and if the main source should be interrupted or fail, a standby battery is provided to obviate the serious consequences that could otherwise follow.

A broad object of the invention is to provide a standby battery and control means for use as indicated above, having novel construction and arrangement for providing novel features and advantages;

1. A digital control circuit is provided that is more responsive than circuits heretofore known.
2. The standby battery is constantly in circuit and in parallel with the rectified DC from the main source and with the electromagnet, thereby preventing any time lapse between failure of the main source and action of the standby battery.
3. The battery is maintained fully charged, but it cannot be overcharged.
4. In the digital circuitry, utilized herein, the ambient temperature does not adversely affect the control as in previous analog circuits.

DETAILED DESCRIPTION

This detailed description covers the individual elements and components, and their functions, and following that are statements of the advantages set out in the beginning Summary, applied specifically to the apparatus.

Figure 1:
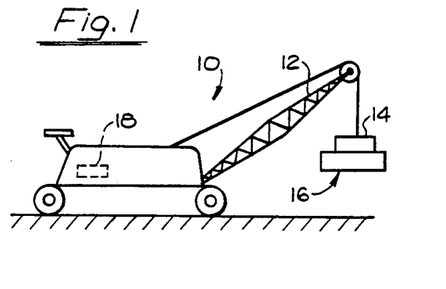
FIG. 1 is a semi-diagrammatic view of a crane incorporating an electromagnet embodying the features of the invention, for lifting a load.
Figure 2:
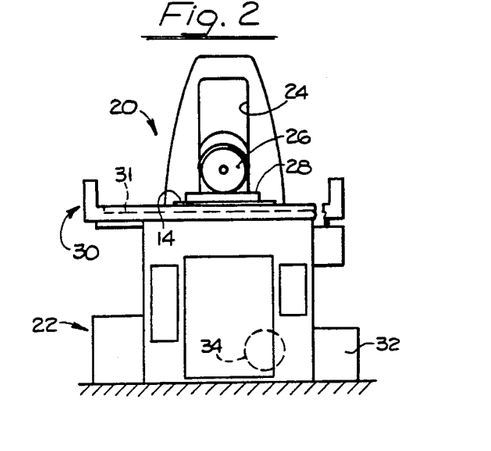
FIG. 2 is a semi-diagrammatic view of a grinder using a electromagnet for holding a load down.
Figure 3:
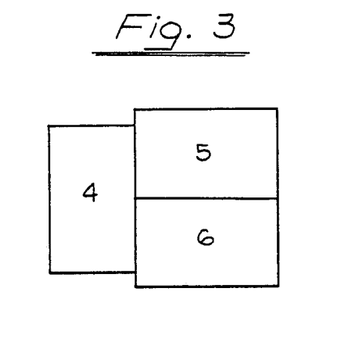
FIG. 3 is a diagram showing the portions of FIGS. 4-6, constituting the electrical circuit, in the positions they occupy therein.

FIG. 1 shows a lift truck or crane 10 of suitable kind having a derrick 12 carrying an electromagnet 14, serving as a lifting magnet. In FIG. 2 it is utilized as a hold down magnetic chuck in a different form of the invention. It is often referred to simply as a magnet, and is so referred to herein, including the claims. Upon its being energized, it is capable of lifting a load 16 (FIG. 1) for carrying it to another location. The magnet is energized by a main AC source 17 (FIG. 4) and the apparatus includes a standby battery 18. The magnet and standby battery are found at the bottom of FIG. 4.

Referring to FIG. 2, where the apparatus is used for holding a load down, in position, a grinder 20 is shown, this being a machine tool of known kind, including a base 22, and a standard 24, in which is mounted a working tool 26. The working tool in the present instance may be a grinding wheel brought into grinding contact with a workpiece 28 on a reciprocating table 30 which is reciprocated under the grinding wheel. The workpiece is held down by the magnet 14 which is mounted in the usual chuck 31 embodied in the reciprocating table. In this case also the magnet is normally energized by the main AC source 17 and upon failure or interruption thereof, the standby battery is brought into use. The standby battery may be placed at any desired location, within the frame of the machine, or at the exterior as indicated at 32 (FIG. 2) which may include a cabinet or case enclosing the battery.

Figure 4:
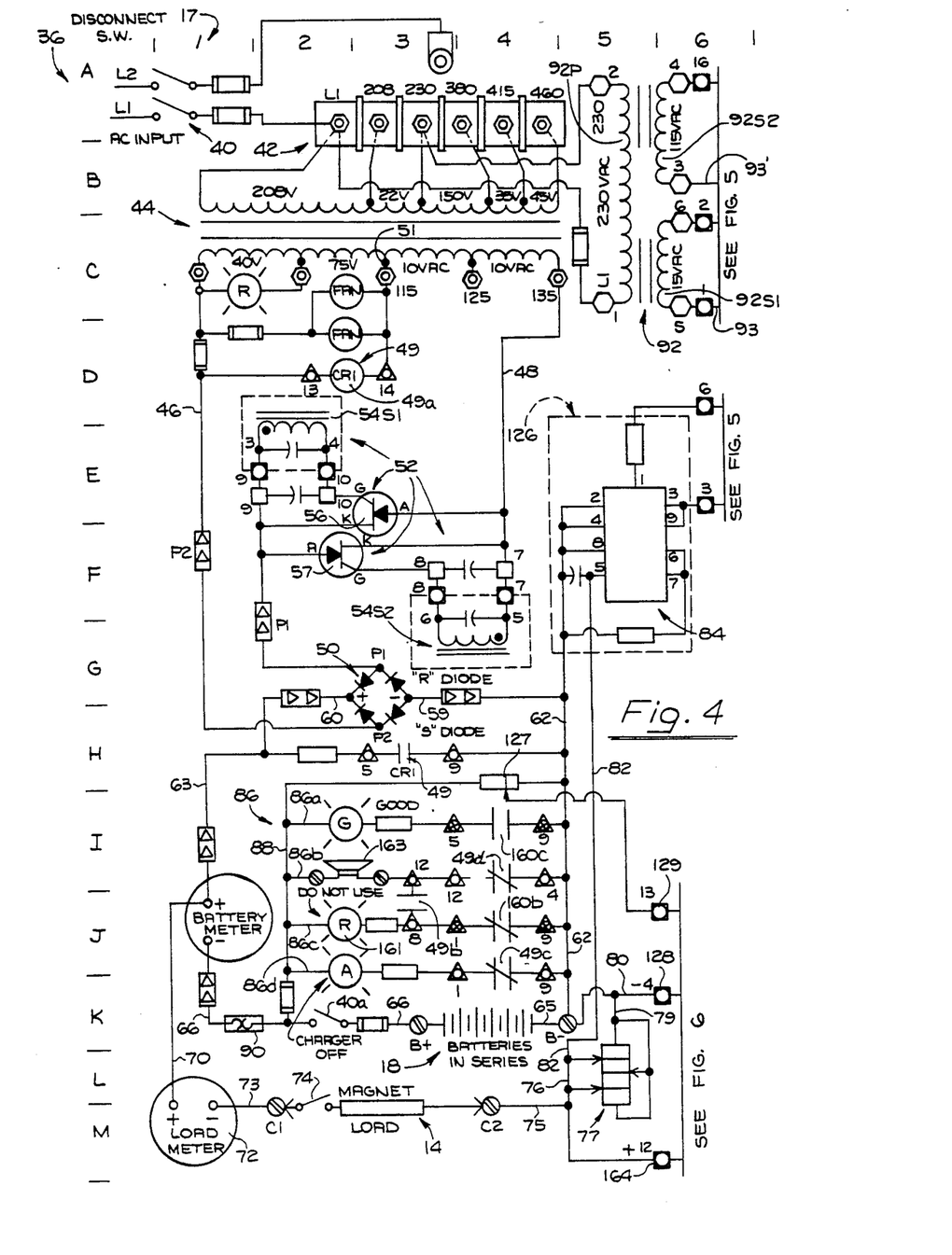
FIG. 4 is a portion of the electrical circuit.
Figure 5:
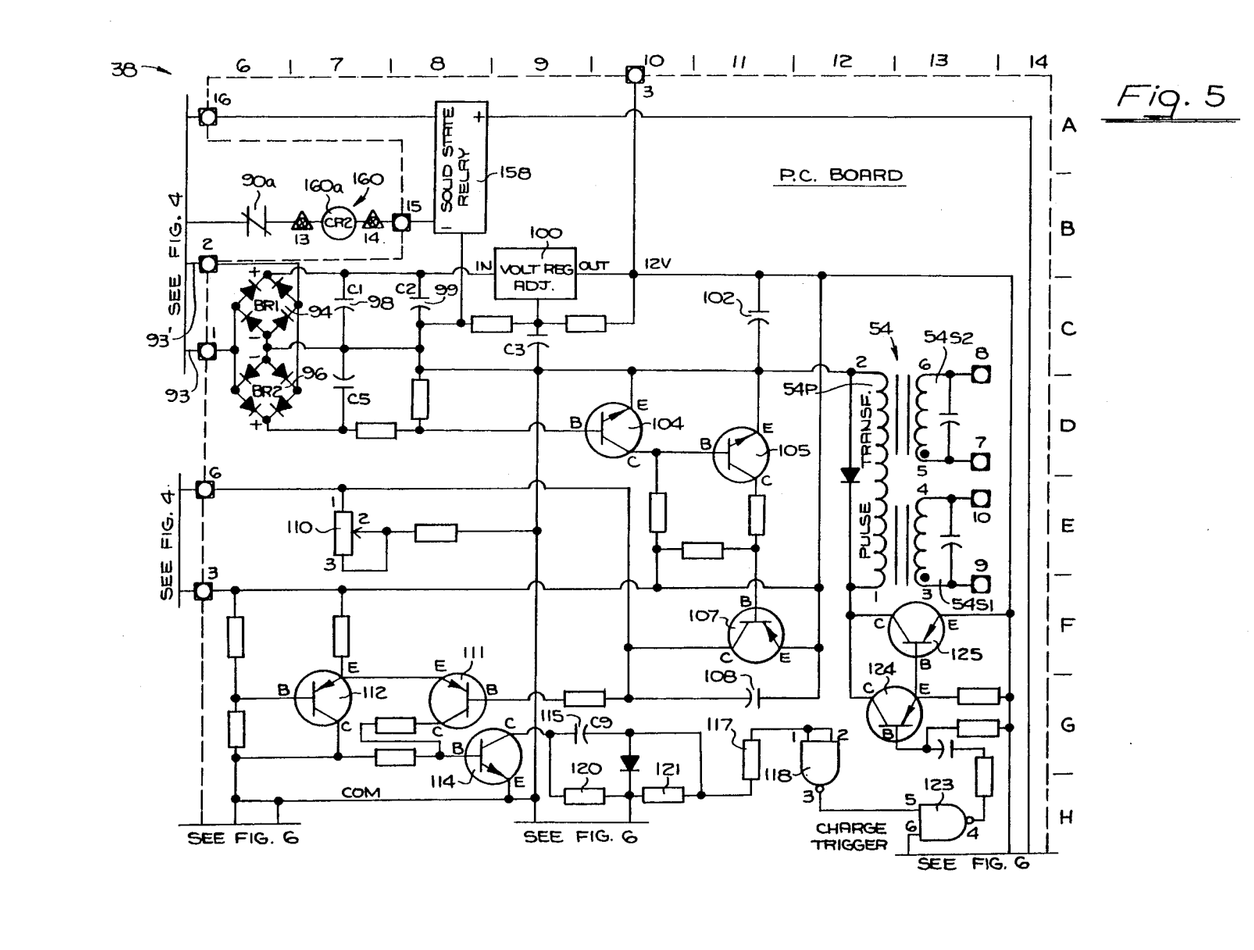
FIG. 5 is a portion of the electrical circuit.
Figure 6:
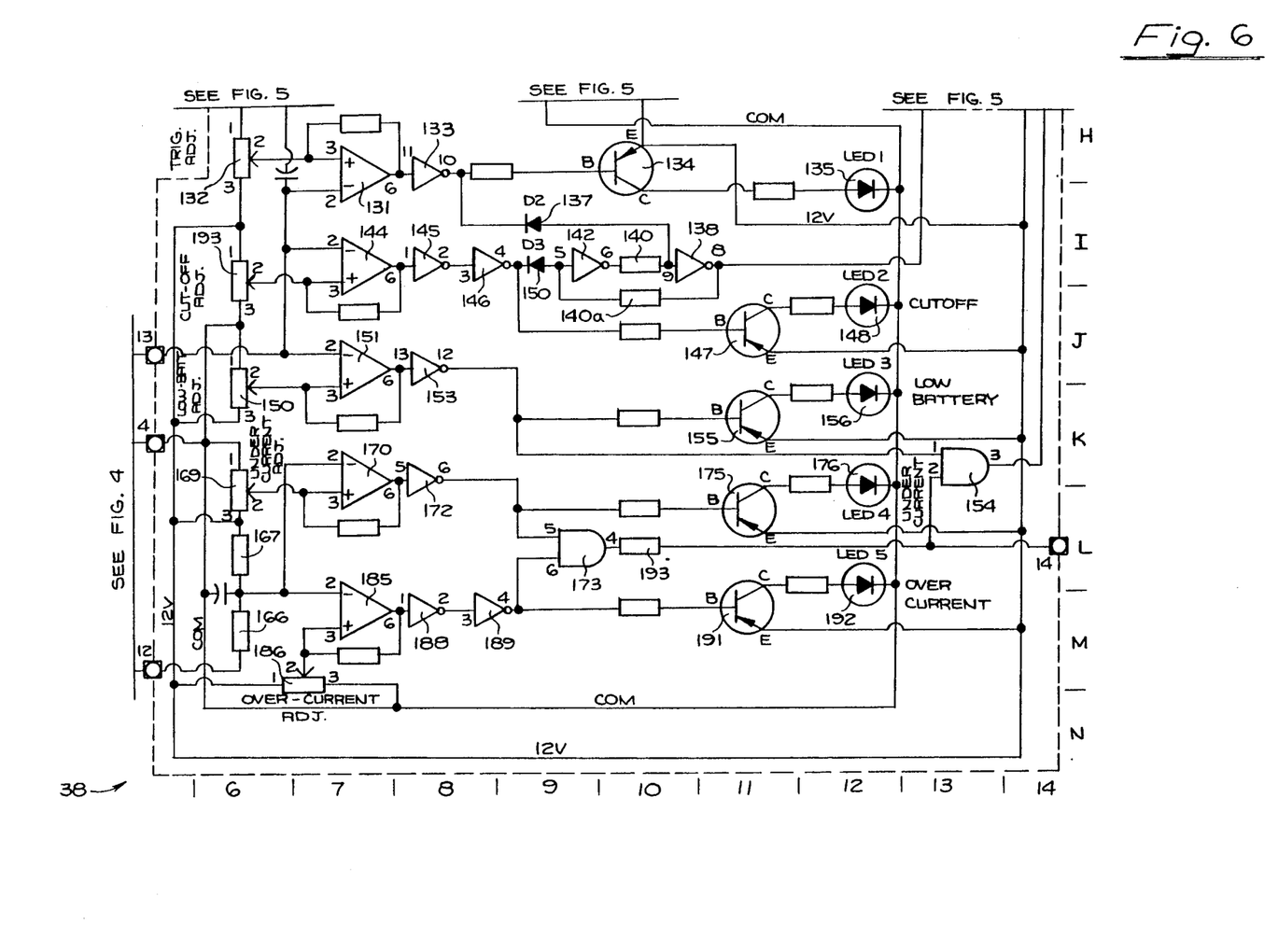
FIG. 6 is a portion of the electrical circuit.
Figure 7:
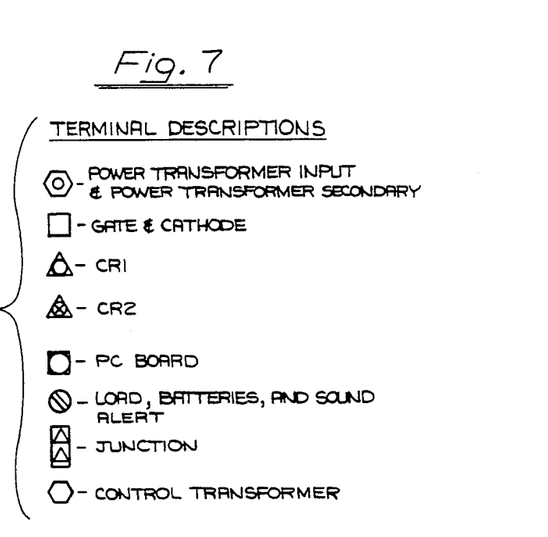
FIG. 7 is a legend including the terminal descriptions utilized in the electrical circuit.

Reference is next made to the electrical circuitry of FIGS. 4-6. The circuitry is provided with marginal letters and numerals forming coordinates to facilitate location of the individual elements referred to. The elements referred to in the description are followed by the coordinates in parenthesis, following the reference numerals identifying this elements. In the circuitry, in the case of FIG. 4 on the right side thereof, and FIGS. 5 and 6 on the left side thereof, certain of the terminals are shown repeated in respectively adjacent circuits, to show continuity.

In the circuitry, the transformers are identified by simple reference numerals, the primaries thereof by the same reference numeral and the postscript. P, and secondaries with the same reference numeral and the postscript S, with additional numerals to indicate individual ones.

Similarly, relays are identified by simple reference numerals, the coils thereof by the same reference numerals and the postscript a, and the contacts thereof by the same reference numerals and the postscripts b, c, and d, etc.

Certain terminals are identified by arabic numerals without lead lines, for convenience in showing connections within the circuit.

The circuitry of FIGS. 4-6 includes a power circuit 36 shown in FIG. 4 and a control circuit 38 in FIGS. 5 and 6 together. The power circuit of FIG. 4 will first be described, and thereafter, the control circuit of FIGS. 5 and 6 which controls the power circuit. The power circuit includes the magnet 14 and battery 18, at the bottom of the figure, as referred to. The main line source 17 leads to a main AC disconnect switch 40 (A-1) which remains closed during normal operation of the apparatus, the main line then leading to switching means 42 for providing selected voltages for use in the circuitry. The battery 18 is constantly in circuit through the switch 40a (K2). The power circuit includes a power transformer 44, and leading from the secondary 44S are conductors, 46, 48 which lead to a power rectifier 50 (G-2). A control relay 49 (D-3) is connected across the conductor 46 and a 115 V connector at 18 51 of the transformer 44.

Incorporated in the conductor 48 is a control unit 52 (E-3) which includes secondaries 54S1, 54S2 of a pulse transformer 54, FIG. 5 (D-13). It will be noted that FIG. 5 shows the complete transformer, the secondaries thus being shown in two locations.

The control unit 52 (E-3) includes back-to-back SCRs 56, 57, associated with the secondaries 54S1, 54S2.

Leading from the output of the rectifier 50 (G-2) are conductors 59, 60 continuing to conductors 62, 63. The conductor 62 leads to another conductor 65 which is connected with the standby battery 18, and continues to another conductor 66, the latter including contacts 40a of the disconnect switch 40 (A-1). The conductor 66 (K-2) connects with a battery meter, or am meter, 68 (J-1), the latter being also connected with the conductor 63 (H-1), this battery meter indicating the current level of the battery.

The conductor 63 leads to another, conductor 70 (L-1) which is connected with a load meter or am meter, 72 indicating the DC current to the magnet 14. Leading from the opposite connection of the load meter is another conductor 73 containing the magnet, and including an operator's switch 74 utilized by the operator in the normal operation of the apparatus. From the opposite connection of the magnet is a conductor 75 which leads to another conductor 76, the latter leading to a resistor 77, and from the other end of the resistor a conductor 79 leads to another conductor 80, the latter being connected with the conductor 62, and thus the conductor 59, completing the circuit through the battery and magnet. Thus the battery is in parallel with the DC output of the rectifier 50 and with the electromagnet, and they remain constantly in interconnection.

The conductor 76 (L-4) connects with another conductor 82 which in turn leads to an IC chip 84 (F-5).

When the DC current is applied to the electromagnet, the same current also flows trough the resistor 77, producing a voltage drop across the resistor, and this voltage drop is then used to control the IC ship 84.

The power circuit of FIG. 4 also includes a bank of signal means or components, referred to generally at 86 (I-1). These signal means are connected in parallel across the conductor 62, 88, in parallel with the standby battery 18 and the magnet 14. These signal means are controlled and actuated by the control circuit of FIGS. 5 and 6 in certain functions explained in detail hereinbelow. They may be referred to for convenience as "safe" and "unsafe" signal means respectively according to the descriptive notes associated therewith. For convenience, they are individually identified 86a, 86b, 86c, and 86d.

The conductor 66 (K-1) includes a thermal overload switch 90 operable for actuating NC contacts 90a (B-6) in the control circuit, these contacts opening if there is excessive overload to the battery.

Also included in the power circuit is the primary 92P (A-5), of a step-down control transformer 92, the secondaries 92S1, 92S2 of which are incorporated in the control circuit (C-5, A-5). The entire control circuit 38 derives its power from the main line 17 through this transformer.

The apparatus and the method of the invention include various modes or phases of operation, which are referred to individually hereinbelow.

Power Supply and Control Circuit

The power supply in the control circuit 38 (FIGS. 5 and 6) is limited to 12 VDC. As stated, this supply is derived from step-down control transformer 92, and referring to the secondary 92S1, this is preferably of 15 VAC. The output of the secondary 92S1 includes conductors 93, 93' leading to control rectifiers 94, 96. The DC output of the rectifier 94 is filtered by capacitors 98, 99, and then applied to the input of a voltage regulator 100 (C-9), which is designed and adjusted for consequent 12 VDC output. A capacitor 102 (C-11) filters this output, and it provides the power requirements of the entire control circuitry 38 of FIGS. 5 and 6.

SCR Phase Control Trigger Circuit

In this phase, attention is directed to the rectifier 96 (D-6), the output of which provides the bias for a transistor 104 (D-10). On each zero crossing of the 60 hertz AC cycle, the transistor 104 is reverse biased and it turns OFF. This causes another transistor 105 (D-11) to turn on, and when this transistor is turned ON, another transistor 107 (F-11) is also turned ON. Whenever the transistor 107 is ON, the capacitor 108 (G-11) discharges, since the transistor 107 is connected directly across that capacitor, but when the transistor 107 is OFF, the capacitor 108 (G-11) will charge up to a certain level. The time needed for the capacitor 108 to reach this level depends on the setting of a potentiometer 110 (E-7). If this potentiometer is set fully advanced, i.e. with the resistance high and the current low, the capacitor 108 (G-11) will charge at its slowest rate, while if the potentiometer is set fully retracted, or in the opposite direction, the capacitor will charge at its fastest. A transistor 111 (G-8) monitors the voltage across the capacitor 108, and when that voltage goes above the reference voltage set by a transistor 112 (G-7), the transistor 111 will turn ON, and when this transistor turns ON, another transistor 114 (G-8) also turns ON, and the output of this transistor 114 is applied to a capacitor 115, resistor 117 (G-11) and then to the inputs of gate 118 (G-12).

By means of the network of the capacitor 115 (G-9) and resistors 120 (G-9), 121 (G-10), a sharp trigger pulse is developed which is then applied to pins 1 and 2 of the gate 118 (H-12). When pin 6 of gate 123 (H-13) is HI, the gate 123 is enabled, and it allows the trigger pulses to pass through, and at the same time it inverts the signals for the necessary bias for the transistors 124 (G-13), 125 (F-13). These transistors are arranged in a darlington pair, which energizes the pulse transformer 54 (D-13). As referred to above, the secondaries of this transformer also are shown in the power circuit (E-2, G-3), and they trigger the power SCRs 56, 57 (F-3). When these SCRs turn ON, AC current is applied to the AC inputs of the rectifier 50 (G-2) and the DC output of this rectifier supplies the current to the battery and to the electromagnet. As mentioned, the battery, 18, appears at (K-4) and the load, which is the magnet 14, appears at (M-2). Also as referred to, when the capacitor 108 (G-11) charges up at its fastest rate, the trigger pulses occur or coincide on the initial portion of the 60 Hz AC half cycles. On the other hand, if the capacitor 108 charges up at the slowest rate, the trigger pulses occur in the end portion of each half cycle.

A pulse is produced at each half cycle, thus there being 120 pulses per second, and in the case where the power SCRs are triggered ON in the initial portion of the cycle, they will remain ON from the trigger point to the end of the cycle, and as a result, nearly the entire cycle is rectified, producing maximum DC output from the rectifier.

The opposite condition occurs when the power SCRs 56, 57 are triggered at the end portion of the cycle, such as when the capacitor 108 charges up at the slowest rate. In this latter situation, the trigger pulses occur at the end portion of the cycle so that very little or no part of the cycle is being rectified, and thus there is little or no DC output from the rectifier 50.

Attention is directed to the additional auxiliary PC board 126 (E-5) which uses said IC chip 84 as a dot-bar driver. When the current is applied to the electromagnet, this same current passes through the resistor 77 (L-5), and a voltage drop is developed across this resistor, which is then applied to the control input, pin 5, of the IC chip 84 which is on the PC board 126 (E-5). This causes the output, pin 1, to go LO, and then this output is connected to terminal 6 of the main PC board. As a result, the capacitor 108 (G-11) charges at a faster rate than that previously set by the potentiometer 110 (E-7). Consequently, maximum DC output is imposed on the load, i.e., the magnet 14 (M-2), and with the magnet in use, a trickle charge of about 2 amperes goes to the battery 18 (K-4). When the magnet is disconnected, no voltage drop will be developed across the resistor 77 (L-5), and the output of the IC chip 84 on the PC board 126 will turn OFF. The capacitor 108 (G-11) will now charge at a slower rate as set by the potentiometer 110 (E-7) which lowers the DC output from the rectifier 50 (G-2). The potentiometer 110 is adjusted to give approximately 4 amperes charging current to the battery, when the battery is approaching full charge.

Automatic Trigger and Cutoff of Charger Circuit

A resistor 127 (I-4) is provided in the conductor 88 and thus is connected across the battery, and used as a voltage divider. This resistor, as an example, is of 7.5K Ohms, 50-Watt value, it being understood that it is not to be limited to that precise value. The voltage across the terminals 128 (K-5), 129 (J-5), represents a portion of the battery voltage, and any changes in the battery voltage level will be reflected at these terminals. The voltage at these terminals is monitored at pin 2 of comparator chip 131 (H-7). A potentiometer 132 (H-6) is provided, and adjusted to the desired battery voltage level at which the charger circuit will trigger ON. When the voltage at pin 2 of the comparator 131 (H-7) goes below the voltage present at pin 3 of that chip as set by potentiometer 132, pin 6 of that comparator goes HI, the same as pin 11 of inverter 133 (H-8). At this point, pin 10 of that inverter goes LO, which turns ON the transistor 134 (H-10) and also the LED 135 (I-12). The LO signal from pin 10 of the inverter 133 (H-8) passes through the diode 137 (I-9) and into pin 9 of the inverter 138 (I-10). Pin 8 of this inverter goes HI, enabling gate 123 (H-13). This allows the trigger pulses present at pin 5 of this gate to pass through and appear at pin 4 of this gate. As a result, transistors 124 (G-12), 125 (F-12) turn ON at each trigger pulse, along with the pulse transformer 54 (D-13). Therefore the power SCRs 56, 57 (F-2) are triggered ON and this starts a charging cycle.

As the battery 18 (K-4) is being charged, the battery voltage will increase and as soon as the voltage at pin 2 of comparator 131 (H-7) goes above the voltage at pin 3 of this comparator, pin 6 of this comparator will go LO. Pin 10 of inverter 133 (H-8) will go HI, turning OFF the transistor 134 (H-10) and the LED 135 (H-12). As a consequence, the HI logic present at pin 10 at the comparator 133 (H-8) will be blocked by the diode 137 (I-9), but the charger circuit will remain ON as will be explained as follows. As mentioned above, when pin 9 of inverter 138 (I-11) goes LO, pin 8 of this gate goes HI.

By means of a resistor 140a (J-10), pin 5 of the inverter 142 (I-9) also goes HI. Pin 6 of this inverter goes LO, and by means of the resistor 140, pin 9 of the gate 138 stays LO. The inverters 142, 138 form a latching flip-flop circuit. As a consequence the charger circuit will remain ON even though pin 6 of the comparator 131 (I-7) goes LO.

The potentiometer 193 (I-6) is adjusted to the desired battery voltage level where the charger circuit should turn OFF, i.e., the cutoff point. As the battery is being charged, the voltage at pin 2 of the comparator 144 (I-7) will eventually go above the voltage present at pin 3 of that comparator. When this occurs, pin 6 of this comparator will go LO, as will pin 1 of the comparator 145 (I-8). Pin 2 of this inverter, and pin 3 of inverter 146 (I-8) go HI. Pin 4 of the inverter 146 goes LO which turns ON the transistor 147 (J-11) and the LED 148 (J-12). Also the LO logic at pin 4 of the inverter 146 (I-8) passes through the diode 150 (I-9) causing pin 5 of the gate 142 (I-9) to go LO. The latching flip-flop circuit consisting of the inverters 142 (I-9), 138 (I-10) will now change state, which causes pin 8 of the inverter 138 (I-10) to go LO. As a result, pin 6 of the gate 123 (H-13) goes LO, which disables this gate. Pin 4 of this gate remains HI with no trigger pulses, Thus the power SCRs 56, 57 (F-2) will cease conducting and the charger circuit is cutoff.

Low Battery Alarm Mode

A potentiometer 150 (K-6) is provided, and adjusted to the desired battery LO level where an alarm signal will be activated. When the battery voltage drops, the voltage at pin 2 of the gate 151 (J-7) goes below the voltage at pin 3 of this gate, pin 6 of this gate goes HI. The same occurs at pin 13 of the inverter 153 (J-8). Pin 12 of this inverter goes LO, as does pin 1 of the gate 154 (K-13). At the same time, the transistor 155 turns ON, which in turn lights up LED 156 (J-12). At this point pin 3 of the gate 154 (K-13) goes LO, which shuts OFF the solid state relay 158 (B-S), and as a result, the relay 160 (B-7) de-energizes. Upon the resulting closing of the NC contacts 160b (J-4), the red lamp 161 of signal 86c (j-2) "Do Not Use" turns ON. Since relay 49 is energized at this time, the contacts 49b (H-3) are closed, and thus the sound alert horn 163 or (J-2) will be sounded. The purpose of this last feature is to alert the operator to the LO battery voltage condition.

Over and Under Current Alarm Mode

Provision is made for signaling and indicating an over-current, and an under-current, condition. For this mode, the resistor 77 (L-5) is placed in series with the load or magnet, 14 (M-2). When current is flowing through the magnet, a voltage drop is developed across this resistor, and the resulting voltage is present at the terminals 128 (J-5) and 164 (M-5). It is to be noted that the voltage drop across resistor 77 is applied to resistors 166 (M-6) and 167 (L-6) which form a voltage divider. The potentiometer 169 (L-6) is adjusted at the desired under-current condition level. If the magnet current decreases, the voltage drop across the resistor 77 (L-5) also decreases. This cause the voltage at pin 2 of the comparator 170 (L-7) to drop below the voltage at pin 3 of this comparator, pin 6 of this comparator will turn HI. Pin 5 of the inverter 172 (L-8) goes HI, and pin 6 of this inverter will go LO, together with pin 5 of the gate 173 (L-9), and the transistor 175 (L-11) and LED 176 will also turn ON. Pin 4 of the gate 173 goes LO, as does pin 2 of the gate 154 (K-13). Pin 3 of this gate goes LO, which turns OFF the solid state relay 158 (B-8), and as a consequence the alarm condition will be triggered. In this step the relay 160 (B-7) will be de-energized and the contacts 160h (J-4) close, and the lamp 161 "Do Not Use" will turn ON. At this point also the sound alert 163 is ON, and the green lamp 183 "Good" (I-2) will turn OFF.

In the case of an over-current condition such as an overload, the voltage drop across the resistor 77 (L-5) will increase, and when the voltage at pin 2 of the comparator 185 (M-7) goes above the voltage at pin 3 of this comparator, as set at the potentiometer 186 (N-7), pin 6 of the comparator 185 will go LO. Pin 2 of the inverter 188 (M-8) and pin 3 of the inverter 189 will now be HI. Pin 4 of the inverter 189 goes LO which turns ON the transistor 191 (M-11) and the LED 192 (L-12). When pin 6 of the gate 173 (L-9) goes LO, pin 4 of this gate goes LO. This causes pin 2 of the gate 154 (K-13) to go LO through the resistor 193 (L-10). Consequently pin 3 of the gate 154 (K-13) goes LO, which turns OFF the solid state relay 158 (B-8). The relay 160 (B-7) drops out, and the red lamp 161 (J-2) "Do Not Use" turns ON. The green lamp 194 (I-2) "Good" turns OFF and the sound alert horn 163 (I-2) turns ON, and is sounded.

AC-OFF Alarm Condition

Another condition to the signal is the failure of the main source or AC source, referred to as an "AC-OFF" condition. In the event that the AC power, at 17, (A-1) should fail, or a fuse be blown in the AC line or charger circuit, the relay 49 (D-2) will be de-energized, and the contacts 49c (I-4) will close, which turns ON the "Charger OFF" lamp, and the sound alert horn 163 will be energized, through contacts 49d.

Figure 8:
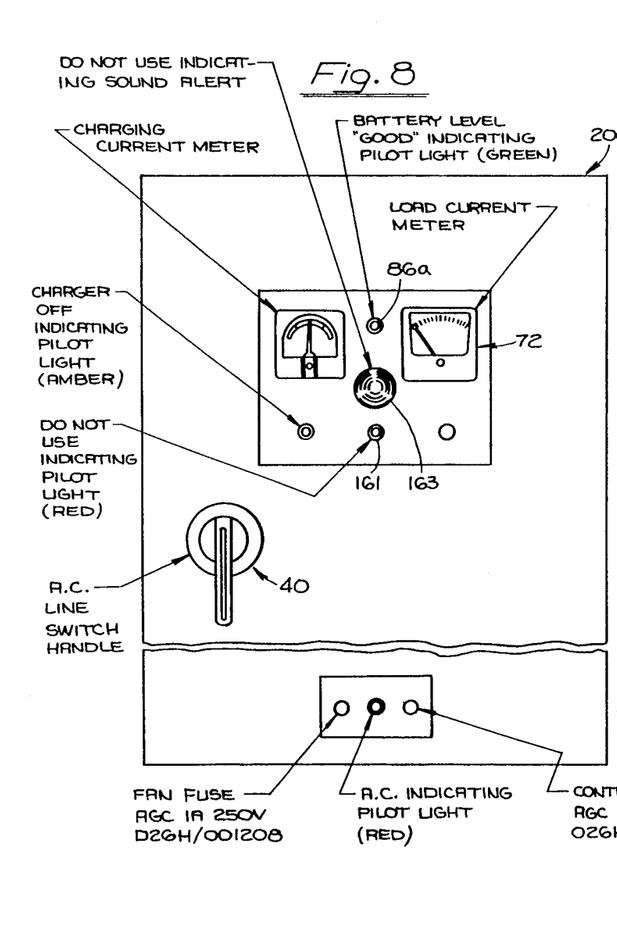
FIG. 8 is a front view of the cabinet containing the controls of the apparatus.
Figure 9:
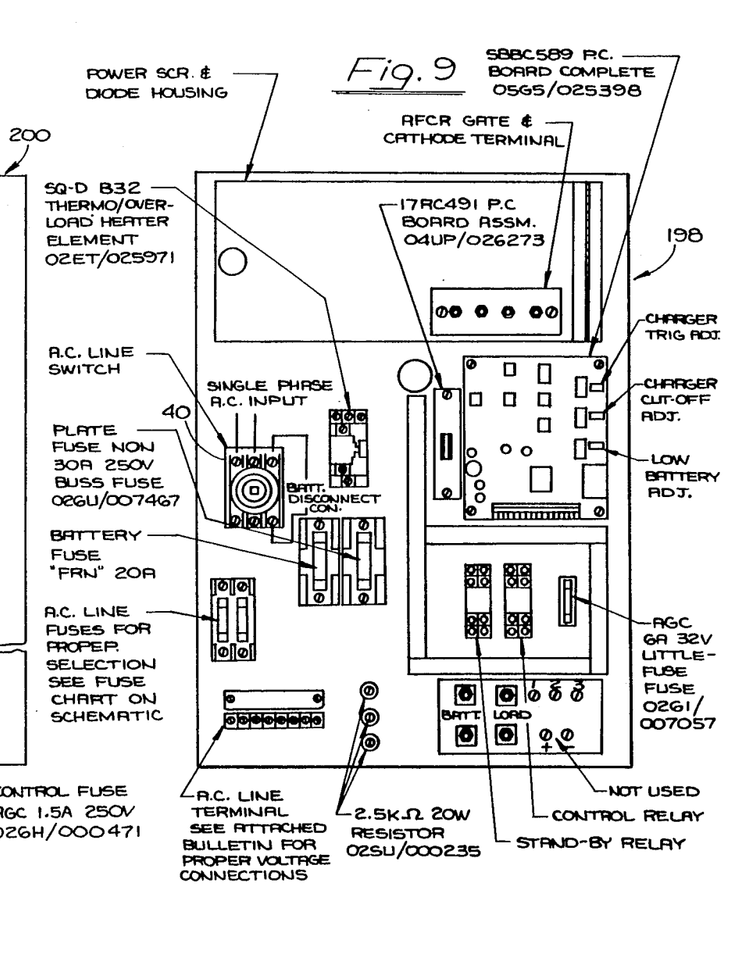
FIG. 9 is a view of the interior of the cabinet of FIG. 8.
Figure 10:
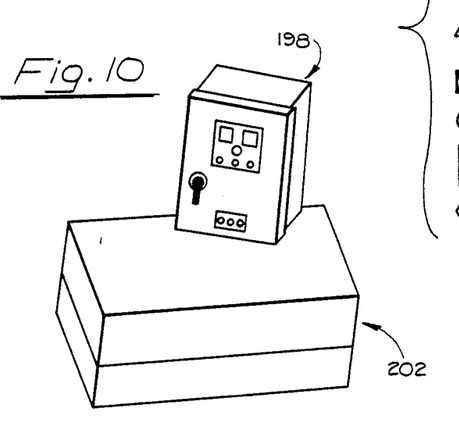
FIG. 10 is a perspective view of the cabinet of FIGS. 8, 9 in association with a cabinet containing the standby battery utilized in the apparatus.

The physical and mechanical aspects of the apparatus are represented in FIGS. 8–10, together with FIGS. 1–2. The circuit wiring and instrumentalities are conveniently incorporated in a cabinet, shown in FIGS. 8–9. In FIG. 9 the cabinet 198 is shown in open front, in which the circuitry and instrumentalities are fitted. FIG. 8 shows the cover 200 of the cabinet 198, in front view with certain of the instrumentalities mounted thereon, or exposed therethrough. That portion of the apparatus including the circuitry and instrumentalities incorporated therein, are thus conveniently mounted in a cabinet that is portable, and can be placed in any convenient location.

FIG. 10 shows the cabinet in a convenient place of use, namely on a cabinet or case 202 which contains the battery 18. The battery is of such size and capacity according to the characteristics of the practical operation in which it is used. For example, the battery may be made up of nine 12 V batteries or cells arranged in series, and the cabinet 202 is dimensioned for receiving those battery cells. Accordingly the battery, mounted in the case, can also conveniently be located where desired.

The effective phase of the control of the apparatus, as produced in the control circuit (FIGS. 5–6) is of digital nature. The pulse transformer 54 (D-13) is energized and actuated according to the trigger pulses produced from the AC half-cycles at the zero crossings. The magnet is energized according to these pulses, corresponding to the phase of the pulses in the respective half-cycles. The trigger pulses from the pulse transformer are imposed on the SCRs 56, 57 (FIG. 4) and thus energize the magnet and charge the battery accordingly. The condition of the magnet and battery, as to voltage level and current level, are controlled by the digital components in FIG. 6, which in turn control the pulse transformer and thereby the charging of the magnet and battery, and in producing the signals in the indicators 86 (FIG. 4 bottom).

As a result of this digital control, extreme accuracy is attained, in contrast to analog control.

Especially effective is the control exerted on the charging operation, through the control of the capacitor 108 (H-11) and the consequent control of the phase of the pulses produced by the pulse transformer, and hence control of the current applied to the magnet and battery.

The digital control circuit is essentially binary in character, and it eliminates drift as in analog circuits. The transistors in the control circuits, are used as switches, i.e., in ON/OFF positions. This is in great contrast to previous arrangements wherein temperature compensations were required to counteract the drift. The complete control circuit (FIGS. 5, 6) is of DC character. The battery is sensed and controlled according to HI-LO conditions.

A great advantage of the present arrangement is that the battery is constantly connected with the rectified DC from the main source, and with the magnet, eliminating any possible delay in connecting the battery upon failure of the main source.

The battery is never discharged. It is constantly monitored, and recharged whether the magnet is energized or not. With normal use, a small portion of power from the main AC is applied to the batteries. This small portion, or trickle, charges the batteries.

The control circuit (FIGS. 5, 6) is extremely simple utilizing less material than heretofore, and easier to manufacture, as well as easier to operate.

Extreme accuracy is attained in the use of this apparatus, the apparatus being capable of controlling the voltages involved to within 1/100 of the intended level. Heretofore apparatus was generally incapable of holding voltages to within several tenths of the intended voltage level.

We claim:

1. Apparatus for charging and controlling a standby battery in circuitry receiving AC from a main power source, the circuitry including a power circuit and a control circuit, the power circuit including an electromagnet and the battery, comprising, a power rectifier in the power circuit for rectifying AC from the main source to DC, circuit means in the power circuit connecting the battery in parallel with the rectified DC from the main source and in parallel with the electromagnet, back-to-back SCRs in the power circuit controlling the AC to the power rectifier, a control transformer having a primary connected with the AC in the main source and a secondary in the control circuity, a control rectifier connected with the secondary of the control transformer, a pulse transformer having a primary connected with the output of the control rectifier and secondaries connected with respective SCR's for energizing the battery, and first control means for measuring the current in the electromagnet and controlling the pulse transformer and thereby the SCR's and the current to the electromagnet, the battery remaining in operable connection with the electromagnet upon interruption for the main AC source.

2. Apparatus according to claim 1 wherein,
said control means includes a capacitor capable, upon discharge thereof, of controlling the pulse transformer,
the apparatus including a potentiometer for controlling the rate of charging the capacitor, and
the apparatus includes second control means for sensing the current in the electromagnet for controlling the rate of charging of the capacitor independently of said potentiometer.

3. Apparatus according to claim 1 wherein,
the power circuit includes a plurality of signal means connected in parallel with each other and in parallel with the battery, and thereby operable independently of the main power source, and
relay means for controlling the respective signal means individually, the relay means being operably controlled by the power circuit and control circuit respectively.

4. Apparatus according to claim 1 and including,
unsafe signal means in parallel with the battery,
voltage drop responsive means between the electromagnet and the battery, and
means responsive to voltage drop of predetermined value through the voltage drop responsive means for actuating said unsafe signal means.

5. Apparatus according to claim 1 wherein,
the power circuit contains the battery and electromagnet constantly in connection, and
the power circuit includes means operable, in response to energization of the AC power source, for charging voltage of predetermined value on the magnet, and for simultaneously therewith producing a trickle current on the battery.

6. Apparatus according to claim 1 wherein,
the control circuit includes a DC portion and a pulse transformer therein,
said DC portion includes trigger means for triggering the pulse transformer, the trigger means including a capacitor,
the control circuit including a potentiometer for controlling the charging of the capacitor at a predetermined first rate, and
means responsive to the current in the electromagnet for controlling the charging of said capacitor at a rate faster than said first rate, independently of said potentiometer.

7. Apparatus according to claim 1 wherein,
the power circuit includes common disconnect switch means, actuated by common means, having switching elements in the AC and a switching element in series with the battery.

8. Apparatus according to claim 3 wherein,
one of said signal means being a "safe" signal means, and
the power circuit includes control means responsive to energization of the power circuit for energizing said one signal means.

9. Apparatus according to claim 2 wherein,
the control circuit includes a DC portion and the pulse transformer is in that DC portion, and
the control circuit includes rectifier means operable for producing pulse in response to and corresponding to AC cycles for triggering the capacitor and discharging it and thereby controlling the pulse transformer and in turn thereby controlling the SCRs.

10. Apparatus according to claim 9 wherein,
the power circuit includes signal means in the DC in parallel with the battery, and
the power circuit includes relay means responsive to the AC and operable thereby for controlling said signal means.

11. Apparatus according to claim 1 wherein, the control circuit includes
(a) a DC portion incorporating the pulse transformer,
(b) a capacitor in the DC portion, capable of discharging upon reaching a predetermined level of charge,
(c) means operable upon discharge of the capacitor for imposing current control pulses therefrom on the pulse transformer,
the level of the charge on the capacitor predetermining the time period of the current pulse therefrom, and
the current control pulses energizing the pulse transformer, and the pulse transformer, when energized, energizing the SCRs, both respectively throughout the length of the pulses.

12. Apparatus according to claim 11 wherein,
the control circuit is operable for producing DC pulses on the capacitor at predetermined values whereby to charge the capacitor to said predetermined level at corresponding time periods, and energize the SCRs and electromagnet during corresponding time periods.

13. Apparatus according to claim 11 and including,
means including voltage drop responsive means responsive to the level of the battery charge for energizing the pulse transformer and thereby the control SCRs and producing a cycle of charging the battery, and
said last means is operable for terminating the charging cycle in response to the charge on the battery reaching said predetermined level.

14. Apparatus according to claim 12 and including,
first control means for predetermining the time periods to the DC pulses.

15. Apparatus according to claim 14 and including,
means responsive to energization of the electromagnet and including voltage drop responsive means for charging the capacitor at a faster rate than as controlled by, and independently of, said first control means, and
said last means being rendered inactive in response to de-energizing of the electromagnet.

16. Apparatus according to claim 1 wherein,
an unsafe indicator is connected in parallel with the battery,
the control circuit includes a first DC portion incorporating a solid state relay,
a second relay is incorporated in series with the solid state relay for retaining said unsafe indicator in OFF condition, and
means responsive to the battery charge falling below a predetermined level operable for de-energizing the solid state relay and thereby enabling the unsafe indicator.

17. Apparatus according to claim 1 wherein,
an unsafe indicator is connected in parallel with the battery,
the control circuit includes a first DC portion incorporating a solid state relay, a second relay is incorporated in series with the solid state relay for retaining said unsafe indicator in OFF condition, and means responsive to the value of the current to the electromagnet and battery increasing above a predetermined level operable for de-energizing the solid state relay and thereby enabling the unsafe indicator.

18. Apparatus according to claim 1 wherein, an unsafe indicator is connected in parallel with the battery, the power circuit includes a relay in the AC portion thereof, and the relay includes NC contacts in series with the unsafe indicator, whereby in response to failure of the AC, the relay becomes de-energized, the contacts close and the unsafe indicator becomes connected with and is energized by the battery.

* * * * *